(12) United States Patent
Kraynev et al.

(10) Patent No.: US 8,360,925 B2
(45) Date of Patent: Jan. 29, 2013

(54) MULTI-SPEED TRANSMISSION WITH COMPOUND AND SIMPLE PLANETARY GEAR SETS AND WITH LAYSHAFTS

(75) Inventors: Alexander Filippovich Kraynev, Moscow (RU); Vladimir Konstantinovich Astashev, Moscow (RU); Konstantin Borisovich Salamandra, Moscow (RU); Madhusudan Raghavan, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 145 days.

(21) Appl. No.: 12/954,939

(22) Filed: Nov. 29, 2010

(65) Prior Publication Data

US 2011/0212807 A1    Sep. 1, 2011

(30) Foreign Application Priority Data

Mar. 1, 2010   (RU) ................. 2010107475

(51) Int. Cl.
*F16H 3/62* (2006.01)
(52) U.S. Cl. ..................... 475/277; 475/288
(58) Field of Classification Search .......... 74/329–331; 475/218, 219, 277, 288
See application file for complete search history.

(56) References Cited

U.S. PATENT DOCUMENTS

| | | | |
|---|---|---|---|
| 4,070,927 A | 1/1978 | Polak | |
| 4,709,594 A | 12/1987 | Maeda | |
| 4,727,764 A * | 3/1988 | Klaue | ............................. 74/331 |
| 5,106,352 A | 4/1992 | Lepelletier | |
| 5,385,064 A | 1/1995 | Reece | |
| 5,497,867 A | 3/1996 | Hirsch et al. | |
| 5,560,461 A | 10/1996 | Loeffler | |

(Continued)

FOREIGN PATENT DOCUMENTS

| EP | 0137597 A2 | 4/1985 |
|---|---|---|
| EP | 2110581 A2 | 10/2009 |

(Continued)

OTHER PUBLICATIONS

Masami Kondo, Yoshio Hasegawa, Yoji Takanami, Kenji Arai, Masaharu Tanaka, Masafumi Kinoshita, Takeshi Ootsuki, Tetsuya Yamaguchi, Akira Fukatsu, "Toyota AA80E 8-Speed Automatic Transmission with Novel Powertrain Control System", SAE Technical Paper Series, Apr. 16-19, 2007, 2007-01-1311, Warrendale, PA 15096-0001 USA.

(Continued)

*Primary Examiner* — David D Le
*Assistant Examiner* — Derek D Knight
(74) *Attorney, Agent, or Firm* — Quinn Law Group, PLLC

(57) ABSTRACT

A transmission is provided that includes a first compound planetary gear set and a second simple planetary gear set. An input member, an output member and the planetary gear sets are arranged coaxially with one another to define a first axis of rotation. A first and a second layshaft are arranged coaxially with one another to define a second axis of rotation. A first set of intermeshing gears transfer torque from the input member to the first layshaft. A second set of intermeshing gears transfer torque from the second layshaft to the second planetary gear set. Seven torque-transmitting mechanisms are engagable in different combinations to establish multiple forward speed ratios and a reverse speed ratio between the input member and the output member.

15 Claims, 1 Drawing Sheet

U.S. PATENT DOCUMENTS

| | | | |
|---|---|---|---|
| 5,599,251 A | 2/1997 | Beim et al. | |
| 5,641,045 A | 6/1997 | Ogawa et al. | |
| 5,651,435 A | 7/1997 | Perosky et al. | |
| 5,916,053 A * | 6/1999 | McCarrick et al. | 475/219 |
| 5,975,263 A | 11/1999 | Forsyth | |
| 6,053,839 A | 4/2000 | Baldwin et al. | |
| 6,071,208 A | 6/2000 | Koivunen | |
| 6,083,135 A | 7/2000 | Baldwin et al. | |
| 6,217,474 B1 | 4/2001 | Ross et al. | |
| 6,354,416 B1 | 3/2002 | Eo | |
| 6,375,592 B1 | 4/2002 | Takahashi et al. | |
| 6,422,969 B1 | 7/2002 | Raghavan et al. | |
| 6,425,841 B1 | 7/2002 | Haka | |
| 6,471,615 B1 | 10/2002 | Naraki et al. | |
| 6,558,287 B2 | 5/2003 | Hayabuchi et al. | |
| 6,623,397 B1 | 9/2003 | Raghavan et al. | |
| 6,840,885 B2 | 1/2005 | Yi et al. | |
| 7,004,878 B2 * | 2/2006 | Gumpoltsberger et al. | 475/218 |
| 7,695,390 B2 * | 4/2010 | Phillips | 475/218 |
| 8,047,944 B2 * | 11/2011 | Glockler | 475/219 |
| 8,146,451 B2 * | 4/2012 | Van Druten et al. | 74/330 |
| 2006/0014603 A1 | 1/2006 | Raghavan et al. | |
| 2007/0131046 A1 * | 6/2007 | Borgerson | 74/331 |
| 2008/0090691 A1 * | 4/2008 | Van Druten et al. | 475/207 |
| 2009/0205450 A1 * | 8/2009 | Gitt | 74/329 |
| 2010/0167865 A1 * | 7/2010 | Glockler | 475/219 |
| 2011/0230299 A1 * | 9/2011 | Kraynev et al. | 475/219 |

FOREIGN PATENT DOCUMENTS

| | | |
|---|---|---|
| JP | 09-126283 A | 5/1997 |
| RU | 2053138 C1 | 1/1996 |
| RU | 2183295 C2 | 6/2002 |
| WO | 03025431 A1 | 3/2003 |
| WO | 2006032312 A1 | 3/2006 |
| WO | 2006074707 A1 | 7/2006 |

OTHER PUBLICATIONS

Hirofumi Ota, Kazutoshi, Nozaki, Atsushi Honda, Masafumi Kinoshita, Toshihiko Aoki, Minoru Todo, Mikio Iwase, "Toyota's World First 8-Speed Automatic Transmission for Passenger Cars", SAE Technical Paper Series, Apr. 16-19, 2007, 2007-01-1101, Warrendale, PA 15096-0001 USA.

* cited by examiner

| Gear State | Speed Ratio | Ratio Step | C1 | C2 | C3 | C4 | C5 | C6 | C7 |
|---|---|---|---|---|---|---|---|---|---|
| 1st | 10.60 | | x | x | | | | | x |
| 2nd | 5.25 | 2.02 | x | | | x | | x | |
| 3rd | 5.20 | 1.01 | x | | x | | | | x |
| 4th | 4.28 | 1.21 | | | x | x | | x | |
| 5th | 3.50 | 1.22 | x | x | | | | x | |
| 6th | 2.90 | 1.21 | | x | | x | | | x |
| 7th | 2.62 | 1.11 | x | | x | | | x | |
| 8th | 1.87 | 1.40 | | x | | x | | x | |
| 9th | 1.50 | 1.25 | x | | | x | x | | |
| 10th | 1.22 | 1.23 | | x | x | | x | | |
| 11th | 1.00 | 1.22 | x | x | | | x | | |
| 12th | 0.75 | 1.33 | x | | x | | x | | |
| 13th | 0.55 | 1.36 | | x | | x | x | | |
| REV | -5.20 | | | | x | x | | | x | x = Engaged State

US 8,360,925 B2

MULTI-SPEED TRANSMISSION WITH COMPOUND AND SIMPLE PLANETARY GEAR SETS AND WITH LAYSHAFTS

CROSS-REFERENCE TO RELATED APPLICATION

This application claims the benefit of Russian Patent Application No. 2010107475, filed Mar. 1, 2010, which is hereby incorporated by reference in its entirety.

TECHNICAL FIELD

The invention relates to a multi-speed planetary transmission with planetary gear sets and layshafts, and having gears establishing five gear planes.

BACKGROUND OF THE INVENTION

Automotive vehicles include a powertrain that is comprised of an engine, a multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising other than the most efficient point. Therefore, manually-shifted (layshaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improved the shift quality of the transmission by making the ratio interchanges substantially imperceptible to the operator under normal vehicle acceleration.

Multi-speed transmissions with greater than four speed ratios provide further improvements in acceleration and fuel economy over three- and four-speed transmissions. However, typical increased complexity, size and cost of such transmissions are competing factors which may prevent their use in some applications.

SUMMARY OF THE INVENTION

A multi-speed transmission that can operate at up to thirteen forward speed ratios is provided that utilizes planetary gear sets and torque transfer using intermeshing gears and layshafts. The transmission includes an input member, an output member, and a stationary member, such as a transmission casing. The transmission further includes a first compound planetary gear set and a second simple planetary gear set. The first compound planetary gear set includes first and second sets of pinion gears that mesh with one another. The first compound planetary gear set has a first, a second, a third, a fourth, and a fifth member. The second simple planetary gear set has a first, a second, and a third member. In referring to the members of the planetary gear sets in this manner, the members may be counted "first" to "fourth" or "first" to "fifth" in any order (i.e., top to bottom, bottom to top, etc.). The members of the planetary gear sets are sun gear members, ring gear members and carrier members. The input member, the output member and the planetary gear sets are arranged coaxially with one another to define a first axis of rotation. A first and a second layshaft are arranged coaxially with one another to define a second axis of rotation. A first set of intermeshing gears, also referred to as transfer gears, are arranged to transfer torque from the input member to the first layshaft. A second set of intermeshing gears, also referred to as transfer gears, are arranged to transfer torque from the second layshaft to the second planetary gear set.

Seven torque-transmitting mechanisms are each selectively engagable to connect a respective member of the planetary gear sets or a respective one of the layshafts to the stationary member or for common rotation with the input member, with another respective member of the planetary gear sets, or with another respective one of the layshafts. As used herein, "common rotation" means rotation at the same speed (i.e., no relative rotation). The seven torque-transmitting mechanisms are three stationary-type clutches (i.e., brakes) and four rotating-type clutches, and are engagable in different combinations to establish up to thirteen forward speed ratios and a reverse speed ratio between the input member and the output member. Alternatively, the transmission may be operated with less than thirteen forward speed ratios, and preferably with at least ten forward speed ratios. Shifts between at least some of the forward speed ratios are single-transition shifts. As used herein, "gear ratio" is the ratio of the torque of the output member to the torque of the input member, while "speed ratio" is the ratio of the speed of the input member to the speed of the output member. Different ones of the clutches may be friction clutches, synchronizers, band clutches, a selectively engagable one-way clutch, a dog clutch, or other types of clutches.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figures 1, 2:
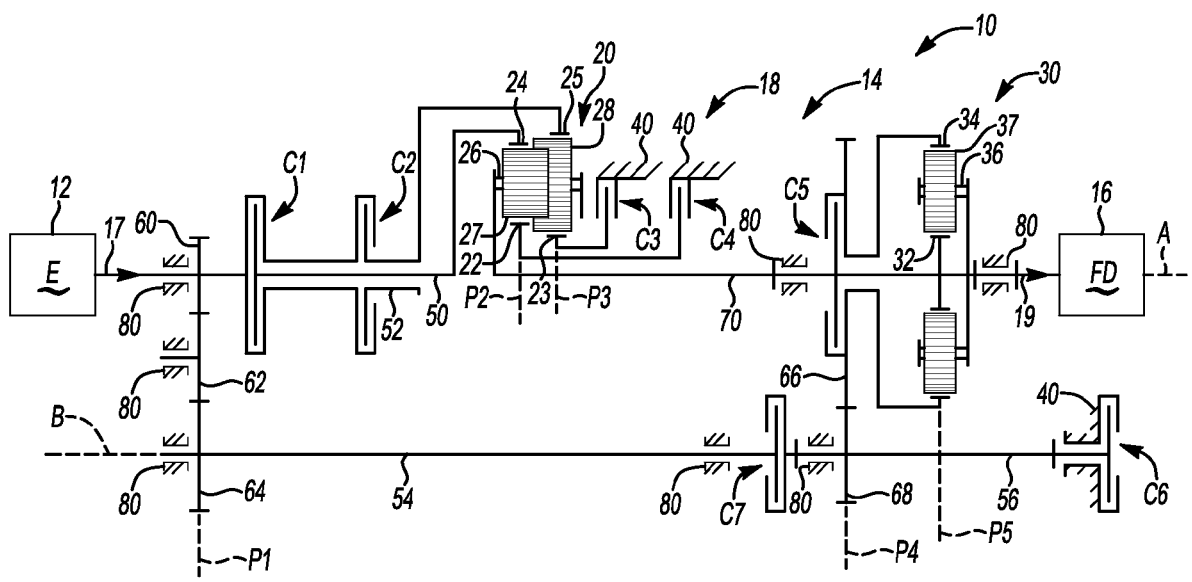
FIG. 1 is a schematic illustration in stick diagram form of a powertrain having a multi-speed transmission.
FIG. 2 is a truth table depicting some of operating characteristics of the transmission shown in FIG. 1.

Referring to the drawings, wherein like reference numbers refer to like components, FIG. 1 shows the powertrain 10 with an engine 12 (labeled E), a combination layshaft and planetary transmission 14, and a final drive mechanism 16 (labeled FD). The engine 12 may be powered by various types of fuel to improve the efficiency and fuel economy of a particular application. Such fuels may include, for example gasoline, diesel, an ethanol, dimethyl ether, etc. The transmission 14 includes an input member 17 continuously connected with an output member of the engine 12, such as a crankshaft, optionally through a torque converter. The transmission 14 further includes a planetary gear arrangement 18, and an output member 19 connected with the final drive mechanism 16 for providing propulsion power to vehicle wheels.

The planetary gear arrangement 18 includes a first compound planetary gear set 20, and a second simple planetary gear set 30. The compound planetary gear set 20 includes two sun gear members 22, 23, two ring gear members 24, 25, and a carrier member 26 that rotatably supports a first set of pinion gears 27 and a second set of pinion gears 28 that mesh with the first set of pinion gears 27. The pinion gears 27 mesh with sun gear member 22 and ring gear member 24. The pinion gears 28 mesh with sun gear member 23 and ring gear member 25. The ring gear member 24 is referred to as a first member of the first compound planetary gear set 20. The ring gear member 25 is referred to as the second member of the first compound planetary gear set 20. The sun gear member 23 is referred to as the third member of the first compound planetary gear set 20. The sun gear member 22 is referred to as the fourth member of the compound planetary gear set 20. The carrier member 26 is referred to as the fifth member of the planetary gear set 20.

The simple planetary gear set 30 includes a sun gear member 32, a ring gear member 34, and a carrier member 36 that rotatably supports a set of pinion gears 37. The pinion gears 37 mesh with sun gear member 32 and with the ring gear member 34. The sun gear member 32 is referred to as a first member of the compound planetary gear set 30. The ring gear member 34 is referred to as a second member of the compound planetary gear set 30. The carrier member 36 is referred to as the third member of the compound planetary gear set 30.

The transmission 14 includes multiple shafts arranged to define two different axes of rotation A and B. An intermediate shaft 50 is connected for rotation with the ring gear member 24. An intermediate shaft 52 is connected for rotation with the ring gear member 25, and is a sleeve shaft concentric with intermediate shaft 50. An interconnecting member 70 continuously connects carrier member 26 for rotation with the sun gear member 32. The interconnecting member 70 is another intermediate shaft coaxial with the intermediate shafts 50 and 52, and with input member 17 and output member 19. The shafts 50, 52, interconnecting member 70, input member 17 and output member 19, as well as planetary gear sets 20 and 30 define and are rotatable about a first axis of rotation A. A first layshaft 54 and a second layshaft 56 are arranged coaxially with one another to define a second axis of rotation B that is spaced from and parallel to the first axis of rotation A.

A first set of intermeshing gears 60, 62, and 64 transfer torque from the input member 17 to the layshaft 54. Gear 60 is connected for rotation with input member 17 and meshes with gear 62. Gear 62 meshes with gear 64, which is connected for rotation with layshaft 54. The input member 17, gear 62, layshafts 54 and 56, interconnecting member 70 and output member 19 are supported for rotation by grounded bearings 80.

A second set of intermeshing gears 66, 68 transfers torque from layshaft 56 to ring gear member 34. Gear 68 is connected for rotation with layshaft 56. Gear 66 is connected for rotation with ring gear member 34 and is coaxial about interconnecting member 70.

The gears of the planetary gear sets 20, 30 and the first and second sets of intermeshing gears 60, 62, 64, and 66, 68, respectively, establish five planes of different intermeshing gears, referred to herein as gear planes. The first set of intermeshing gears 60, 62, 64 mesh in gear plane P1. The ring gear member 24, pinion gears 27, and sun gear member 22 mesh in gear plane P2. The ring gear member 25, pinion gears 28, and sun gear member 23 mesh in gear plane P3. The second set of intermeshing gears 66, 68 mesh in gear plane P4. The ring gear member 34, pinion gears 37 and sun gear member 32 mesh in gear plane P5. The gear planes P1-P5 extend perpendicular to the drawing sheet in FIG. 1.

The transmission 14 further includes seven torque-transmitting mechanisms: a first torque-transmitting mechanism C1, a second torque-transmitting mechanism C2, a third torque-transmitting mechanism C3, a fourth torque-transmitting mechanism C4, a fifth torque-transmitting mechanism C5, a sixth torque-transmitting mechanism C6, and a seventh torque-transmitting mechanism C7. Torque-transmitting mechanisms C1, C2, C5 and C7 are rotating-type clutches. Torque-transmitting mechanisms C3, C4, and C6 are stationary-type clutches, also referred to as brakes.

As is apparent in FIG. 1, the output member 19 is continuously connected for common rotation with carrier member 36. Carrier member 26 is continuously connected for common rotation with sun gear member 32 via interconnecting member 70.

The first torque-transmitting mechanism C1, also referred to as clutch C1, is a rotating-type clutch selectively engagable to connect the input member 17 for common rotation with the ring gear member 24 via intermediate shaft 50. The second torque-transmitting mechanism C2, also referred to as clutch C2, is a rotating-type clutch selectively engagable to connect the input member 17 for common rotation with the ring gear member 25 via intermediate shaft 52. The third torque-transmitting mechanism C3, also referred to as brake C3, is a stationary-type clutch selectively engagable to ground the sun gear member 23 to the stationary member 40. The fourth torque-transmitting mechanism C4, also referred to as brake C4, is a stationary-type clutch selectively engagable to ground sun gear member 22 to the stationary member 40. The fifth torque-transmitting mechanism C5, also referred to as clutch C5, is a rotating-type clutch selectively engagable to connect the carrier member 26 for common rotation with the ring gear member 34 via the interconnecting member 70. The sixth torque-transmitting mechanism C6, also referred to as brake C6, is a stationary-type clutch selectively engagable to ground layshaft 56 to the stationary member 40. The seventh torque-transmitting mechanism C7, also referred to as clutch C7, is selectively engagable to connect layshaft 54 for common rotation with layshaft 56. The position of clutch C7 between the coaxial layshafts 52 and 54 allows the use of a dog clutch for clutch C7. Alternatively, a plate clutch could be used. In other embodiments, the torque-transmitting mechanisms may be still different types of clutches.

As shown in the truth table of FIG. 2, the torque-transmitting mechanisms C1, C2, C3, C4, C5, C6 and C7 are selectively engagable in combinations of three to provide thirteen forward speed ratios forward speed ratios and a reverse speed ratio (listed as gear states). Numerical gear ratios corresponding with the speed ratios are listed in FIG. 2. The gear ratio is the ratio of the torque of the output member 19 to the torque of the input member 17.

The numerical gear ratios set forth in FIG. 2 result from the tooth counts establishing the following gear ratios for the first compound planetary gear set 20: the gear ratio of the ring gear member 24 to the sun gear member 22 is −2.0 assuming the carrier member 26 is stopped (for purposes of calculation only); the gear ratio of the ring gear member 25 to the sun gear member 23 is −4.5 assuming the carrier member 26 is stopped (for purposes of calculation only). The tooth counts for the second planetary gear set 30 are selected so that the gear ratio of the ring gear member 34 to the sun gear member 32 is −2.5, assuming the carrier member 36 is stopped (for purposes of calculation only).

With the tooth counts listed above, there are ten underdrive speed ratios (1st to 10th), a direct drive (11th), and two overdrive speed ratios (12th and 13th) that result in the ratio steps listed in FIG. 2. As is apparent in FIG. 2, the ratio steps are relatively even in the forward speed ratios, resulting in smooth shift feel and increased fuel efficiency as the engine 12 need only operate over a narrow range of speeds in each speed ratio.

Other gear tooth counts and corresponding gear ratios may be selected to accomplish speed ratios and ratio steps advantageous to the particular transmission application. A person of ordinary skill in the art of transmission design would understand how to select desirable tooth counts.

To establish the reverse speed ratio, clutch C7 and brakes C3 and C4 are engaged. Because clutch C7 is engaged, torque is carried from the input member 17 through the set of intermeshing gears 60, 62, 64 to layshafts 54 and 56. Because brakes C3 and C4 are engaged, none of the members of the planetary gear set 20 rotate, so carrier member 36, interconnecting member 70 and sun gear member 32 do not rotate. Thus, torque is provided from layshaft 56 through the set of intermeshing gears 68, 66, through planetary gear set 30 to output member 19. The output member 19 rotates in an opposite direction from the input member 17.

To establish the first speed ratio, clutches C1, C2 and C7 are engaged. Torque is carried from the input member 17 to both ring gear members 24 and 25 to carrier member 26. Because both ring gear members 24 and 25 rotate at the same speed, planetary gear set 20 is inactive. Accordingly, carrier member 26 and sun gear member 32 rotate at the speed of the input member 17. Torque is also carried through the set of intermeshing gears 60, 62, 64, layshafts 54 and 56, and set of intermeshing gears 66, 68 to ring gear member 34. Torque at sun gear member 32 and ring gear member 34 is combined through planetary gear set 30 to output member 19. Effectively, speed of the ring gear member 34 is subtracted from the speed of the sun gear member 32 through the planetary gear set 30. Input member 17 and output member 19 rotate in the same direction, as in all of the forward speed ratios.

An alternative first forward speed ratio, or an additional speed ratio, could be achieved by engaging clutches C2 and C7, and brake C3. Torque would be carried from the input member 17 through ring gear member 25 to carrier member 26, and to sun gear member 32. Torque would also carried through the set of intermeshing gears 60, 62, 64, layshafts 54 and 56, and set of intermeshing gears 66, 68 to ring gear member 34. Torque at sun gear member 32 and ring gear member 34 would be combined through planetary gear set 30 to output member 19. Effectively, speed of the ring gear member 34 is subtracted from the speed of the sun gear member 32 through the planetary gear set 30. The alternative first forward speed ratio would provide a speed ratio of 23.40 with the gear tooth counts discussed above.

In the second forward speed ratio, clutch C1 and brakes C4 and C6 are engaged. Torque is carried from the input member 17 through ring gear member 24 to carrier member 26, and to sun gear member 32 through planetary gear set 30 to output member 19. Because brake C6 is engaged, ring gear member 34 is held stationary. The shift from the first forward speed ratio to the second forward speed ratio is a double-transition shift, in that two of the three torque-transmitting mechanism engaged in the second forward speed ratio are different than those engaged in the first forward speed ratio.

In a third forward speed ratio, clutches C1 and C7 and brakes C3 are engaged. Torque is carried from the input member 17 through ring gear member 24 to carrier member 26, and to sun gear member 32. Torque is also carried through the set of intermeshing gears 60, 62, 64, layshafts 54 and 56, and set of intermeshing gears 66, 68 to ring gear member 34. Torque at sun gear member 32 and ring gear member 34 is combined through planetary gear set 30 to output member 19. Effectively, speed of the ring gear member 34 is subtracted from the speed of the sun gear member 32 through the planetary gear set 30. The shift from the second forward speed ratio to the third forward speed ratio is a double-transition shift.

In a fourth forward speed ratio, clutch C2 and brakes C3 and C6 are engaged. Torque is carried from the input member 17 through ring gear member 25 to carrier member 26, to the sun gear member 32. Because brake C6 is engaged, ring gear member 34 is held stationary. Torque at sun gear member 32 flows through planetary gear set 30 to carrier member 36 and output member 19. The shift from the third forward speed ratio to the fourth forward speed ratio is a double-transition shift.

In a fifth forward speed ratio, clutches C1 and C2 and brake C6 are engaged. Because both ring gear members 24 and 25 rotate at the same speed, planetary gear set 20 is inactive. Accordingly, carrier member 26 and sun gear member 32 rotate at the speed of the input member 17. Because the ring gear member 34 is held stationary by engagement of brake C6, torque at sun gear member 32 flows through planetary gear set 30 to carrier member 36 and output member 19. The shift from the fourth forward speed ratio to the fifth forward speed ratio is a single-transition shift.

In a sixth forward speed ratio, clutches C2 and C7 and brake C4 are engaged. Torque is carried from the input member 17 through ring gear member 25 to carrier member 26, and to sun gear member 32. Torque is also carried through the set of intermeshing gears 60, 62, 64, layshafts 54 and 56, and set of intermeshing gears 66, 68 to ring gear member 34. Torque at sun gear member 32 and ring gear member 34 is combined through planetary gear set 30 to output member 19. Effectively, speed of the ring gear member 34 is subtracted from the speed of the sun gear member 32 through the planetary gear set 30. The shift from the fifth forward speed ratio to the sixth forward speed ratio is a double-transition shift.

In a seventh forward speed ratio, clutch C1 and brakes C3 and C6 are engaged. Torque is carried from the input member 17 to the ring gear member 24 through the first compound planetary gear set 20, to the carrier member 36 through planetary gear set 30 to output member 19, with ring gear member 34 held stationary by engagement of brake C6. The shift from the sixth forward speed ratio to the seventh forward speed ratio is a triple-transition shift.

In an eighth forward speed ratio, clutch C2 and brakes C4 and C6 are engaged. Torque is carried from the input member 17 through ring gear member 25 to carrier member 26, and to sun gear member 32 through planetary gear set 30 to output member 19, with ring gear member 34 held stationary by engagement of brake C6. The shift from the seventh forward speed ratio to the eighth forward speed ratio is a double-transition shift.

In a ninth forward speed ratio, brake C4 and clutches C1 and C5 are engaged. Torque is carried from the input member 17 through ring gear member 25 to carrier member 26, and to both sun gear member 32 and ring gear member 34, through planetary gear set 30 to output member 19. Because the ring gear member 34 rotates at the same speed as the sun gear member 32 when clutch C5 is engaged, the planetary gear set 30 is inactive. The shift from the eighth forward speed ratio to the ninth forward speed ratio is a double-transition shift.

In a tenth forward speed ratio, brake C3 and clutches C2 and C5 are engaged. Torque is carried from the input member 17 through ring gear member 25 to carrier member 26, and to both sun gear member 32 and ring gear member 34, through planetary gear set 30 to output member 19. Because the ring gear member 34 rotates at the same speed as the sun gear member 32 when clutch C5 is engaged, the planetary gear set 30 is inactive. The shift from the ninth forward speed ratio to the tenth forward speed ratio is a double-transition shift.

In an eleventh forward speed ratio, clutches C1, C2 and C5 are engaged. Torque is carried from the input member 17 to both ring gear members 24 and 25 to carrier member 26. Because both ring gear members 24 and 25 rotate at the same speed, planetary gear set 20 is inactive. Accordingly, carrier member 26 and sun gear member 32 rotate at the speed of the input member 17. Because the ring gear member 34 rotates at the same speed as the sun gear member 32 when clutch C5 is engaged, the planetary gear set 30 is inactive. Accordingly, the speed of the output member 19 is the same as the speed of the input member 17, and a direct drive speed ratio is achieved. The shift from the tenth forward speed ratio to the eleventh forward speed ratio is a single-transition shift.

In a twelfth forward speed ratio, clutches C1, C5 and brake C3 are engaged. Torque is carried from the input member 17 to ring gear member 24 to carrier member 26 and sun gear member 32. Because the ring gear member 34 rotates at the same speed as the sun gear member 32 when clutch C5 is engaged, the planetary gear set 30 is inactive. Torque at sun gear member 32 and ring gear member 34 is provided to output member 19, which rotates at the same speed as the carrier member 26. The shift from the eleventh forward speed ratio to the twelfth forward speed ratio is a single-transition shift.

In a thirteenth forward speed ratio, clutches C2, C5 and brake C4 are engaged. Torque is carried from the input member 17 through ring gear member 25 to carrier member 26, and to both sun gear member 32 and ring gear member 34, through planetary gear set 30 to output member 19. Because the ring gear member 34 rotates at the same speed as the sun gear member 32 when clutch C5 is engaged, the planetary gear set 30 is inactive. The shift from the twelfth forward speed ratio to the thirteenth forward speed ratio is a double-transition shift.

As set forth in the above discussion of the various speed ratios, whenever the brake C6 is engaged (i.e., in the second, fourth, fifth, seventh, and eighth speed ratios), torque flow is according to a first mode, through both the planetary gear set 20 and the planetary gear set 30, with both gear sets being active (i.e., affecting the ratio of the torque of the output member 19 to that of the input member 17). Whenever the clutch C5 is engaged (i.e., in the ninth, tenth, eleventh, twelfth, and thirteenth speed ratios), the planetary gear set 30 rotates as a unit (i.e., the ring gear member 34, sun gear member 32, and carrier member 36 all rotate at the same speed), so that only the planetary gear set 20 is active in affecting the ratio of the torque of the output member 19 to that of the input member 17. Whenever clutch C7 is engaged to establish a forward speed ratio (i.e., in the first, second, and sixth speed ratios), torque at the ring gear member 34 provided through the layshafts 54, 56, is subtracted from torque provided to the sun gear member 32 through the first planetary gear set 20.

Although thirteen forward speed ratios are available, the transmission 14 may be controlled to operate with only some of the available forward speed ratios. For example, the transmission 14 may be configured to operate as a six-speed transmission, a seven-speed transmission, an eight-speed transmission, a nine-speed transmission, a ten-speed transmission, an eleven speed transmission or a twelve speed transmission. The transmission 14 could also be operated with less than six forward speed ratios.

In one manner of operating the transmission 14 as a six-speed transmission, an algorithm stored in a controller that controls valves that direct hydraulic fluid flow to the torque-transmitting mechanisms may establish only the reverse speed ratio, and the second, fifth, eighth, tenth, eleventh, and twelfth forward speed ratios described above as first, second, third, fourth, fifth, and sixth forward speed ratios. In such a six-speed transmission, there would be only one double-transition shift between the third and fourth forward speed ratios (i.e., from the eighth to the tenth forward speed ratios of FIG. 2).

To operate the transmission 14 as a seven-speed transmission, the fourth, second, fifth, eighth, ninth, tenth, eleventh, and twelfth forward speed ratios of FIG. 2 could be utilized. The seven-speed transmission would have two double-transition shifts (from the eighth to the tenth forward speed ratio of FIG. 2, and from the twelfth to the thirteenth forward speed ratio of FIG. 2, which would be the third to the fourth and the sixth to the seventh forward speed ratio of the seven-speed transmission).

To operate the transmission 14 as an eight-speed transmission, the seven forward speed ratios described for the seven-speed transmission could be utilized, as well as the ninth forward speed ratio of FIG. 2. The eight-speed transmission would have three double-transition shifts (from the eighth to the ninth forward speed ratio of FIG. 2, from the ninth to the tenth forward speed ratio of FIG. 2, and from the twelfth to the thirteenth forward speed ratio of FIG. 2, which would be from the third to the fourth, the fourth to the fifth, and from the seventh to the eighth forward speed ratios of the eight-speed transmission).

To operate the transmission 14 as a nine-speed transmission, all of the forward speed ratios described for the eight speed transmission would be utilized, as well as the sixth forward speed ratio of FIG. 2. The nine-speed transmission would have four double-transition shifts (the fifth to the sixth, the eighth to the ninth, and the ninth to the tenth, and the twelfth to the thirteenth forward speed ratios of FIG. 2, which would be from the second to the third, the fourth to the fifth, the fifth to the sixth, and from the eighth to the ninth forward speed ratios of the nine-speed transmission).

To operate the transmission as a ten-speed transmission, all of the forward speed ratios described above for the nine-speed transmission would be utilized, as well as the fourth forward speed ratio of FIG. 2. The ten-speed transmission would have five double-transition shifts (from the second to the fourth, the fifth to the sixth, the eighth to the ninth, and the ninth to the tenth, and the twelfth to the thirteenth forward speed ratios of FIG. 2, which would be the from the first to the second, the third to the fourth, the fifth to the sixth, the sixth to the seventh, and from the ninth to the tenth forward speed ratios of the ten-speed transmission).

To operate the transmission as an eleven-speed or a twelve-speed transmission, different combinations of the thirteen forward speed ratios of FIG. 2 would be selected to provide the desired number of speed ratios. For example, any one of the first, the third, and the seventh forward speed ratios of FIG. 2 would be added to the ten-forward speed ratios described above for the ten-speed transmission to operate as an eleven-speed transmission, and any two of these speed ratios would be added to operate as a twelve-speed transmission. The forward speed ratios would be selected to minimize the number of double and triple transition shifts, while maintaining desirable ratio steps.

It is evident in FIG. 1 that clutches C1 and C2 are located axially adjacent one another with no other clutches or brakes and no members of the planetary gear sets 20, 30 between the clutches C1 and C2. Locating clutches C1 and C2 adjacent one another in this manner enables hydraulic fluid flow to the clutches C1 and C2 to be through mostly common feed channels. Simplifying the hydraulic feed channels and reducing the overall length of the feed channels simplifies production of the transmission 14 and may enable a smaller pump for the hydraulic system.

The powertrain 10 may share components with a hybrid vehicle, and such a combination may be operable in a "charge-depleting mode". For purposes of the present invention, a "charge-depleting mode" is a mode wherein the vehicle is powered primarily by an electric motor/generator such that a battery is depleted or nearly depleted when the vehicle reaches its destination. In other words, during the charge-depleting mode, the engine 12 is only operated to the extent necessary to ensure that the battery is not depleted before the destination is reached. A conventional hybrid vehicle operates in a "charge-sustaining mode", wherein if the battery charge level drops below a predetermined level (e.g., 25%) the engine is automatically run to recharge the battery. Therefore, by operating in a charge-depleting mode, the hybrid vehicle can conserve some or all of the fuel that would otherwise be expended to maintain the 25% battery charge level in a conventional hybrid vehicle. It should be appreciated that a hybrid vehicle powertrain is preferably only operated in the charge-depleting mode if the battery can be recharged after the destination is reached by plugging it into an energy source.

While the best modes for carrying out the invention have been described in detail, those familiar with the art to which this invention relates will recognize various alternative designs and embodiments for practicing the invention within the scope of the appended claims.

The invention claimed is:

1. A multi-speed transmission comprising:
an input member;
an output member;
a stationary member;
a first compound planetary gear set and a second simple planetary gear set; wherein the input member, the output member and the planetary gear sets are arranged coaxially with one another to define a first axis of rotation;
a first and a second layshaft arranged coaxially with one another to define a second axis of rotation;
a first set of intermeshing gears arranged to transfer torque from the input member to the first layshaft;
a second set of intermeshing gears arranged to transfer torque from the second layshaft to the second planetary gear set;
seven torque-transmitting mechanisms each selectively engagable to connect a respective member of the planetary gear sets or a respective one of the layshafts to the stationary member or for common rotation with the input member, with another respective member of the planetary gear sets or with another respective one of the layshafts; the seven torque-transmitting mechanisms being engagable in different combinations to establish multiple forward speed ratios and a reverse speed ratio between the input member and the output member; and
wherein the second set of intermeshing gears transfers torque from the second layshaft to a ring gear member of the second planetary gear set; and wherein a sixth of the seven torque-transmitting mechanisms is selectively engagable to ground the second layshaft to the stationary member, thereby grounding the ring gear member of the second planetary gear set.

2. The multi-speed transmission of claim 1, wherein the first compound planetary gear set has a first, a second, a third, a fourth, and a fifth member; wherein the second planetary gear set has a first, a second, and a third member; wherein the members of the planetary gear sets are sun gear members, ring gear members and carrier members; wherein the first and the second members of the first compound planetary gear set are selectively connected for common rotation with the input member via engagement of a first and a second of the seven torque-transmitting mechanisms, respectively.

3. The multi-speed transmission of claim 2, wherein the first and the second torque-transmitting mechanisms are located axially adjacent one another.

4. The multi-speed transmission of claim 1, wherein the first compound planetary gear set has a first, a second, a third, a fourth, and a fifth member; wherein the second planetary gear set has a first, a second, and a third member; wherein the members of the planetary gear sets are sun gear members, ring gear members and carrier members; and wherein the third and fourth members of the first compound planetary gear set are selectively grounded to the stationary member via engagement of a third and a fourth of the seven torque-transmitting mechanisms, respectively.

5. The multi-speed transmission of claim 1, wherein the first compound planetary gear set has a first, a second, a third, a fourth, and a fifth member; wherein the second planetary gear set has a first, a second, and a third member; wherein the members of the planetary gear sets are sun gear members, ring gear members and carrier members; and wherein the fifth member of the first compound planetary gear set is continuously connected for common rotation with the first member of the second compound planetary gear set via an interconnecting member.

6. The multi-speed transmission of claim 5, wherein a fifth of the seven torque-transmitting mechanisms is selectively engagable to connect the first member of the second compound planetary gear set for common rotation with the second member of the second compound planetary gear set.

7. The multi-speed transmission of claim 1, wherein a seventh of the seven torque-transmitting mechanisms is selectively engagable to connect the first layshaft for common rotation with the second layshaft, thereby transferring torque from the input member to the ring gear member of the second planetary gear set via the first and second sets of intermeshing gears and the first and second layshafts.

8. The multi-speed transmission of claim 7, wherein the seventh torque-transmitting mechanism is a dog clutch.

9. The multi-speed transmission of claim 1, wherein the first planetary gear set has a first, a second, a third, a fourth, and a fifth member; wherein the second planetary gear set has a first, a second, and a third member; wherein the members of the planetary gear sets are sun gear members, ring gear members and carrier members;
wherein the first member of the first compound planetary gear set is selectively connected for common rotation with the input member by engagement of the first torque-transmitting mechanism; wherein the second member of the first compound planetary gear set is selectively connected for common rotation with the input member by engagement of the second torque-transmitting mechanism; wherein the third member of the first compound planetary gear set is selectively grounded to the stationary member by engagement of the third torque-transmitting mechanism; wherein the fourth member of the first compound planetary gear set is selectively grounded to the stationary member by engagement of the fourth torque-transmitting mechanism; and further comprising:

an interconnecting member continuously connecting the fifth member of the first compound planetary gear set for common rotation with a member of the second planetary gear set.

10. The multi-speed transmission of claim 1, wherein the first compound planetary gear set has two sun gear members, two ring gears members, and a carrier member that rotatably supports a stepped pinion having a first portion with a first diameter and a second portion with a second diameter larger than the first diameter; wherein the first portion meshes with one of the two sun gear members and one of the two ring gear members and wherein the second portion meshes with the other of the two sun gear members and the other of the two ring gear members.

11. The multi-speed transmission of claim 1, wherein shifts between at least some of the forward speed ratios are single-transition shifts.

12. The multi-speed transmission of claim 1, wherein gears of the sets of intermeshing gears and members of the planetary gear sets mesh in five different planes, respectively.

13. The multi-speed transmission of claim 1, wherein the seven torque-transmitting mechanisms are engagable in different combinations of three to establish up to thirteen forward speed ratios and a reverse speed ratio between the input member and the output member.

14. A multi-speed transmission comprising:
an input member;
an output member;
a stationary member;
a first compound planetary gear set and a second simple planetary gear set;
wherein the input member, the output member and the planetary gear sets are arranged coaxially with one another to define a first axis of rotation;
a first and a second layshaft arranged coaxially with one another to define a second axis of rotation;
a first set of intermeshing gears arranged to transfer torque from the input member to the first layshaft;
a second set of intermeshing gears arranged to transfer torque from the second layshaft to the second planetary gear set;
seven torque-transmitting mechanisms each selectively engagable to connect a respective member of the planetary gear sets or a respective one of the layshafts to the stationary member or for common rotation with the input member, with another respective member of the planetary gear sets or with another respective one of the layshafts; the seven torque-transmitting mechanisms being engagable in different combinations to establish multiple forward speed ratios and a reverse speed ratio between the input member and the output member;
wherein the second set of intermeshing gears transfers torque from the second layshaft to a ring gear member of the second planetary gear set; and
wherein a seventh of the seven torque-transmitting mechanisms is selectively engagable to connect the first layshaft for common rotation with the second layshaft, thereby transferring torque from the input member to the ring gear member of the second planetary gear set via the first and second sets of intermeshing gears and the first and second layshafts.

15. The multi-speed transmission of claim 14, wherein the seventh torque-transmitting mechanism is a dog clutch.

* * * * *